United States Patent Office 3,168,647
Patented Feb. 2, 1965

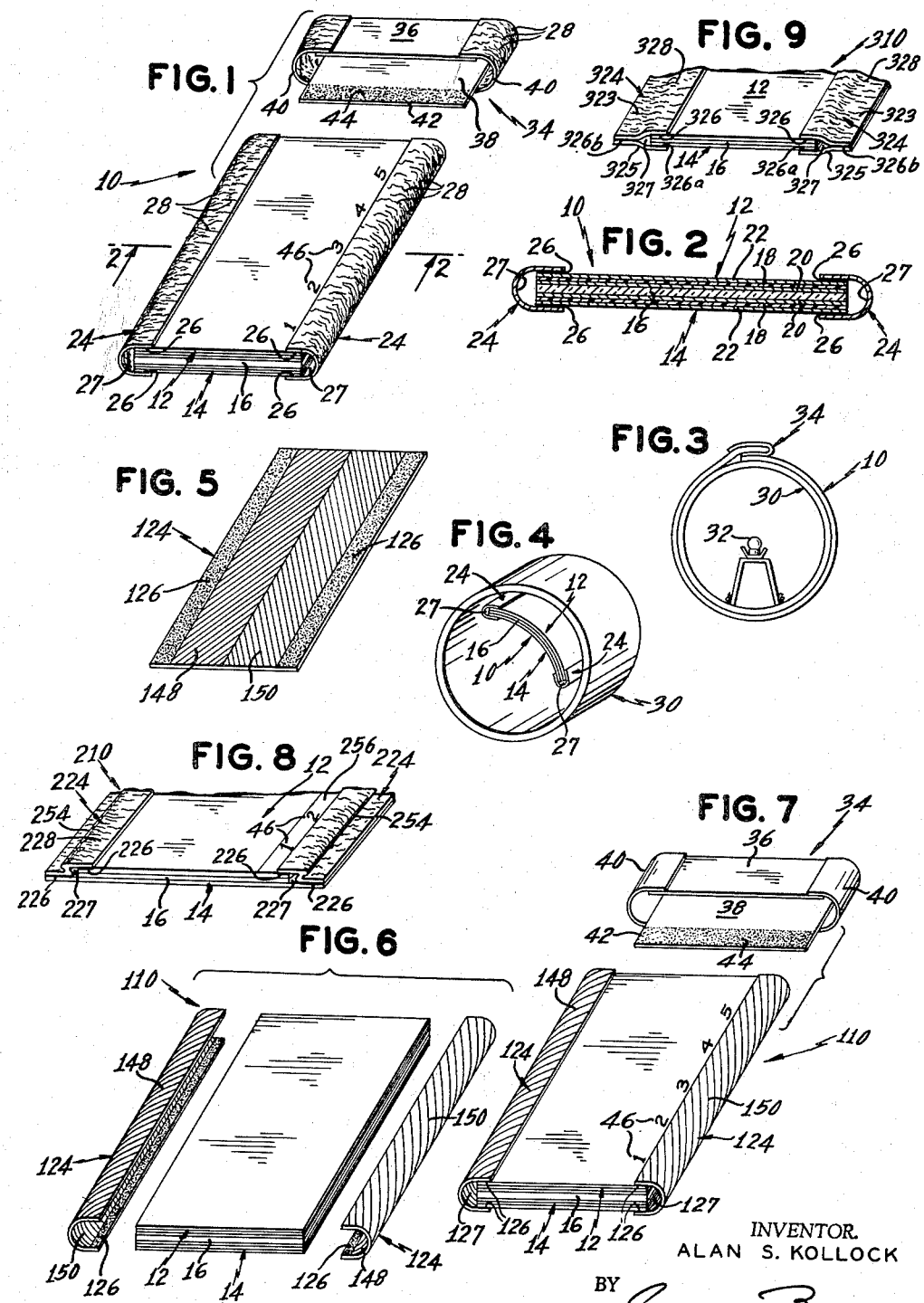

3,168,647
FILM HOLDERS FOR STRIP FILM
Alan S. Kollock, New Hyde Park, N.Y., assignor to General Magnaplate Corporation, Belleville, N.J., a corporation of New Jersey
Filed Aug. 3, 1961, Ser. No. 129,143
14 Claims. (Cl. 250—68)

This invention relates to film holders. More particularly, to film holders for strip film employed in industrial radiography.

An object of the invention is to provide a film holder for use in radiography that will permit the flexing and bending of the film to the desired contour of the article to be radiographed. To accomplish this purpose and to produce a more desirable photographed image of the article than has been possible heretofore, it is important that the film be capable of being positioned as closely as possible to the surface of the article or workpiece. In the past, this has been difficult of accomplishment because film holders previously known and utilized in the art have failed to permit flexure of the film holder and relative movement of the parts thereof, thereby resulting in a buckling of the sides or walls of the film holder. This buckling resulted in a deleterious spacing of the film within the holder from the surface to be radiographed or X-rayed. In consequence, the filmed image was often blurred or imperfect and at times required time consuming film development techniques. These problems evidenced in the prior art resulted in time consuming preparation for radiography and, therefore, an increased and often prohibitive expense in the wholesale or large scale use of industrial radiography.

It is an object of this invention to eliminate and overcome the apparent disadvantages of the prior art by providing a film holder that incorporates certain of the novel inventive features contained in applicant's co-pending United States patent application Serial No. 84,687, filed January 24, 1961, now Patent No. 3,119,105, dated January 21, 1964, this application being a continuation-in-part thereof.

Another object of the invention is to provide a film holder wherein the sheet members thereof, overlying opposite sides of the photo sensitive film, normally protect the same from exposure to light, but are capable of being flexed individually and moved lengthwise or longitudinally as well as widthwise or transversely relative to each other when the film is snugly wrapped about an irregular contour of a workpiece to be radiographed without deleterious buckling or bubbling.

Still another object of the invention is the provision of a film holder, the sheet members of which are connected together in such manner as to enable the same to be moved both in a lengthwise and widthwise direction, as the need arises, while also permitting the same to be flexed.

A further feature and object of the invention resides in the unique details of construction of bound sheet members forming the opaque surfaces of a film holder that enable the inexpensive yet practical construction by which the same may be snugly contoured to irregularly shaped workpieces.

Another feature of the invention resides in a novel arrangement of structure that enables the production of an image on the film without the use of individual lead lettering or symbols as is presently used in the art.

Other and further objects of this invention reside in the structures and arrangements hereinafter more fully described with reference to the accompanying drawing in which:

FIG. 1 is a perspective exploded view of a film holder constructed according to the teaching of the invention, FIG. 2 is an enlarged disproportionate cross-section of FIG. 1 taken along lines 2—2, FIG. 3 is an end view of a workpiece illustrating one manner of use of the invention, FIG. 4 is a perspective view of a workpiece illustrating another manner of use of the invention, FIG. 5 is a perspective view of a binding constructed according to the teaching of the invention, FIG. 6 is an exploded view illustrating the details of an embodiment of the invention, FIG. 7 is an exploded perspective view of the embodiment shown in FIG. 6 in condition to be assembled, FIG. 8 is a perspective view of another embodiment constructed in accordance with the teaching of the invention, and FIG. 9 is a perspective view of still another embodiment of the invention.

Referring now to FIGS. 1 and 2 of the drawing, the embodiment of the film holder thereshown is generally identified by the numeral 10. Film holder 10 comprises a plurality of sheet members each of which is generally identified as individual units by the numerals 12 and 14. For purposes of explanation, the unitary sheet member 12 may be referred to as the upper while the unitary sheet member 14 may be referred to as the lower, although in practice it will be immaterial which of the two sheet members is used as the upper or the lower. The sheet members 12 and 14 are adapted to be positioned on opposite sides of a strip of photosensitive film 16. For this purpose, the sheet members 12 and 14 are of substantially the same length and width as the exposure dimensions of the strip of film 16 in order to fully cover the same in overlying relationship along opposite sides thereof.

Although the sheet members 12 and 14 may be of substantially the same structural details as those taught in applicant's aforementioned co-pending patent application, the laminar construction of each unitary sheet member 12 and 14 may be concisely described as being composed of a plurality of layers each of which is relatively secured to the other. As illustrated in the drawing, the sheet members 12 and 14 are of duplicate construction and, therefore, contain like details of laminations with such laminations being in mirror-hand arrangement on opposite sides of the film strip 16 sandwiched therebetween. The laminar construction of each sheet member 12 and 14 comprises a central or intermediate layer 18 of bodying material as mylar acetate or any other convenient flexible material.

Further, included in the construction of the sheet members 12 and 14 are at least two radio lucent layers 20 and 22 secured to opposite sides of the central layer 18. The inner layer 20 may be an intensifying screen composed of a thin layer of X-ray fluorescent material as lead foil positioned in touching relationship with its respective side surface of the film 16. The other or outer layer 22 of each sheet member 12 and 14 may be in the form of a sheet of aluminum foil or any other opaque material that is substantially pin hole free and the radiation absorptive ability of which is less than that of lead.

In actual practice, it has been found that excellent results are achieved form this combination of laminations. By virtue of the X-ray fluorescence of the intensifying screens 20 on opposite sides of the film surface 16 the apparent speed of the film is increased. Since the thickness of each of the sheet members 12 and 14 is in the order of but a few thousandths of an inch and because such sheet members are unusually flexible in nature, it is difficult by present manufacturing techniques to provide an intensifying screen 20 that is relatively free of holes, such holes generally being denoted as pin holes. For this reason, therefore, the opaque aluminum layer 22 is provided. The aluminum layer is substantially pin hole free and, when bonded to the opposite side of the layer 18, results in a unitary sheet member 12 or 14 that is, for all intents and purposes, opaque. It has been found that this combination of laminations serves to materially reduce the period of exposure of the film 16 to radiation from that previously required to produce a clear and definite image on the film.

The inventive details, however, should not be deemed to be limited to the use of a lead intensifying screen or an aluminum opaque layer. It has been found from experience that other materials as bismuth, tin, copper and calcium tungstate could be employed as an intensifying screen since the radiation absorption ability is greater than that of lead. In like manner, it has been found feasible to utilize a light opaque layer 18 and eliminate the use of the layer of aluminum foil 22. However, in so doing, production problems have been introduced that render the cost of the product unreasonably expensive. Under such conditions, when the layers 18 of both sheet members 12 and 14 were opaque and were secured to their respective intensifying screens 20, they had a lesser radiation absorption ability than both the aluminum foil and the lead screen and thus permitted the use of the film holder under lower source voltage conditions with excellent results in lowered exposure times and simpler development procedures.

Sheet members 12 and 14 are connected together in their overlying mirror-hand relationship on opposite sides of the film strip 16 by binding or connection means generally identified by the numeral 24. The connection means 24 are composed of a light-tight or opaque flexible stretchable material has lengthwise edges in overlying relationship with respective lengthwise edge portions of the sheet members 12 and 14. The connecting means 24 are then bound to their respective edges of the sheet members 12 and 14 along the outer surfaces thereof either by the use of an adhesive 26 or any other convenient form of bonding or connection. It is to be noted, however, that the connecting means 24 have their central body portions spaced laterally at 27 from the widthwise edges of the sheet members 12 and 14. Although FIGS. 1 and 2 of the drawing illustrate a large space 27 for purposes of explanation, in practice the space is much smaller.

The body of the connecting means 24 is gathered or creped or wrinkled either in a random manner as shown or uniformly if so required. It may be said that the gathering, crepeing or wrinkling is in the form of deformable corrugations 28. The corrugations are deformable in response to a relative sliding movement lengthwise and also widthwise or transversely of the sheet members 12 and 14 relative to each other. During such movement, the material of which the connecting means 24 is made moves with its respective sheet members 12 and 14 by virtue of the connections therewith at 26. Being of flexible nature, the material deforms the corrugations in accordance with the movement of the sheet members.

The corrugations 28 thus serve as elastic, stretchable take-up or expansion means that normally serve to retain the sheet members 12 and 14 in their relatively connected positions as shown in FIGS. 1 and 2, but deform and stretch in absorbing the flexings during the relative movement of such sheet members. If the bindings or connecting means 24 are made of an elastomeric material, the corrugations will yield upon the relative movement of such sheet members and then, when such movement is eliminated, tend to return the sheet members 12 and 14 to their normal relative positions.

In like manner, the bindings or connecting means 24 are flexible to permit unrestricted individual flexing of the sheet members 12 and 14 when the same are snugly contoured about a workpiece to be radiographed. The spaces 27 between the bodies of the connecting means 24 and that of the edges of the sheet members 12 and 14, coupled with the yielding nature of the material and the corrugations 28, also permit the relative widthwise or lateral movement of the sheet members 12 and 14.

To more fully understand the significance of the invention, reference is now made to the workpiece 30 shown in FIG. 4. For purposes of illustration, an X-ray tube or source of radiating material 32 is shown positioned within the workpiece 30. Thus, when it is desired to radiograph the periphery of the workpiece 30, the film holder 10 including the strip of film 16 therein is snugly wrapped about the desired position of the workpiece. The sheet members 12 and 14 conform snugly to the workpiece since they are unusually thin and of a flexible material.

However, it will be recognized that, if the lower sheet member 14 is positioned against the outer surface of the workpiece 30, it has a lesser distance to travel than does the upper or outer sheet member 12. In consequence, there results a relative sliding movement between the sheet members 12 and 14. If this sliding movement is prohibited or in any way restricted, a buckling of either the surface of the sheet member 14 or the surface of the sheet member 12 will result. This buckling or bubbling, as it is referred to in the industry, physically spaces portions of the film 16 away from the surface of the workpiece 30. In consequence, when the film is exposed to the radiating effects of the source 32, certain portions of the film will be more greatly exposed than others, thereby resulting in an uneven image.

However, if the buckling of the sheet members 12 and 14 can be completely obviated, eliminated or prevented, the entire surface of the film 16 will remain evenly positioned with respect to the surface of the workpiece 30 and spaced therefrom solely by the thickness of the sheet member 14. Additionally, the intensifying screens 20 on opposite sides of the film 16 enable a material reduction in the period of exposure of the film to the source of radiation 32 resulting in a material saving in exposure cost and time. This is especially important when thousands of such exposures must be made along the surface of large irregularly shaped workpieces.

The flexible connecting means 24 having the yieldable deformable corrugations 28 flex and yield in response to the relative lengthwise movement of the sheet members 12 and 14 to permit the same to assume uneven positions about the workpiece regardless of the contour thereof without so restricting their movements as to cause the same to buckle or bubble. In like manner, if the film holder 10 were required to be utilized in the interior of the workpiece as illustrated in FIG. 4, the sheet members 12 and 14 would assume uneven widths with respect to each other and bend unevenly relative to each other within the workpiece 30. If this flexing and relative widthwise movement of the sheet members were not permitted, the deleterious buckling and bubbling of the sheet members 12 and 14 would again result. Such buckling and bubbling is obviated by providing the slight space 27 between the body of the connecting means 24 and the edges of the sheet members 12 and 14. In addition, however, the deformable, stretchable corrugations 28 permit relative flexing and widthwise movement of the sheet members 12 and 14 to enable the same to be snugly contoured in lateral or widthwise bending relationship with the surface of the workpiece.

Inasmuch as the required length of the film holder 10 necessary to perform the desired radiography may be drawn off a large roll of such material, it is oftentimes practical to cap the ends of the film holder to prevent light from entering between the sheet members 12 and 14 thereof and exposing the film 16 therebetween. To this end, there is provided a cap structure generally identified by the numeral 34. The cap 34 is constructed in a similar manner to that of the film holder 10 by including a flexible upper sheet member 36 and a similar lower sheet member 38 each of which is bound together by flexible yieldable bindings or connecting means 40. The sheet members 36 and 38 may be of the same laminar construction as the sheet members 12 and 14.

The cap is open at just one entry end and includes an elongated flap 42 on the member 38 that is provided with an inner adhesive surface 44. The opening or entranceway of the cap 34 is sufficiently large to receive a respective end of the film holder 10 therein. When the film holder 10 is so positioned therein, that end thereof inserted into the cap 34 is light-tightly closed. The cap is then removably retained to the film holder 10 simply by pressing the adhesive surface 44 against the adjacent outer surface of the adjacent sheet member 12 or 14. Naturally the cap may be reusable since the adhesive surface 14 does not readily wear away. The use of the cap member 34 is illustrated in FIG. 3 and only one of the same may be required when the ends of the film holder 10 overlap each other as shown.

Frequently, in industrial radiography, it is difficult to determine the relative location of a flaw in the workpiece unless some correlating indexing is provided on the developed film and the workpiece. To facilitate this, the present invention is inherently adapted to produce indices on the exposed film 16 that may be co-related with indices provided on the workpiece. In the field, the film holder 10 can be quickly and easily scribed or indented with a sharp instrument, a stone or a pen knife, to provide the indices 46 thereon while similar marks may be aligned therewith on the workpiece. To provide such indices 46 the workman need only disturb the outer surface of one of the sheet members 12 or 14 by indenting the same inward.

This indenture forces the interior surface of the intensifying screen 20 into closer contact or engagement with the adjacent surface of the film 16. Hence, when the film is exposed to radiation, the disturbed portion 46 of the film holder 10 results in an intensification of sensitivity of the film to the radiation and thus leaves a similar mark or image on the exposed and developed film. If a flaw in the workpiece should be evidenced in the developed film, the workman can then readily pin point the location of the same on the workpiece by simply realigning the index mark 46 exposed on the film with the like index mark previously made by the worker on the workpiece. This simple manner of disturbing the surface of the film holder at 46 thereby results in a quick and easy method of indexing the film with that of the workpiece.

The embodiment of the invention illustrated in FIGS. 5, 6 and 7 is substantially the same as that described with respect to the film holder 10 shown in FIGS. 1 and 2 differing therefrom only in the construction of the bindings or connecting means generally identified in FIGS. 5, 6 and 7 by the numeral 124. For this reason, therefore, the film holder embodiment shown in FIGS. 5, 6 and 7 is generally identified by the numeral 110 and those parts thereof corresponding in exact detail to the film holder embodiment 10 are similarly numbered inasmuch as a duplicate description thereof would merely be redundant.

As in the prior embodiment 10, the sheet members 12 and 14 may be bound together along their longitudinal edges to permit the same to be bent flexibly while also enabling the same to be moved relative to each other in both the lengthwise and widthwise or lateral directions if the need arises. The bindings or connecting means 124 comprise a flexible opaque material that is provided with a plurality of grains 148 and 150. In practice, the connecting means 124 can be made of a fabric material wherein the grains 148 and 150 indicate the direction of a plurality of weaves. The laterally spaced lengthwise edges of the connecting means 124 are provided with adhesive zones 126. Referring to FIG. 6, it will be noted that, when the connecting means 124 is formed in a C-shape, the adhesive surfaces 126 will be brought into corresponding engagement with lengthwise edge portions of the outer surfaces of the sheet members 12 and 14 to bind such sheet members together as illustrated in FIG. 7.

It will be recognized that, because the grains or weaves 148 and 150 are in different directions, they permit lengthwise relative movement of the sheet members 12 and 14 to which they are connected in the direction of the weaves or grains and will normally tend to return such sheet members to their original positions. The slight space 127 between the bodies of the connecting means 124 and the adjacent edges of the sheet members 12 and 14 will be sufficient to enable such sheet members to move laterally or in a widthwise direction relative to each other. A cap structure 34 of the type described with respect to embodiment 10 may be similarly employed with the film holder embodiment 110 while the provision of indices 46, simply by disturbing the surface of one of the sheet members to create an impression or image on the film 16 contained within the film holder, may be accomplished in the same manner as previously described.

The embodiment of the film holder shown in FIG. 8 is generally identified by the numeral 210 and comprises a pair of flexible opaque sheet members 12 and 14 that may be of the same laminar construction as previously described. However, in the embodiment 210, one of the sheet members 12 or 14 may be wider than the other. In FIG. 8, the sheet member 12 has been arbitrarily illustrated as being of substantially the same width and length as the strip of film 16 to fully protect its respective one surface thereof from exposure to light. The other sheet member 14 is substantially wider than that of the film strip 16 and the sheet member 12 so that it extends widthwise or laterally beyond the side edges of both the film and the upper sheet member.

Both sheet members 12 and 14 may be bound together by utilizing the binding or connecting means 24 shown in the film holder embodiment 10 or 124 described with respect to the embodiment 110. In either case, the binding or connecting means 24 or 124 will be sufficiently flexible to permit the sheet members 12 and 14 to be bent and flexed individually without such restriction as will prevent them from accomplishing their desired functions and also to permit lengthwise and widthwise or lateral movement of the sheet members relative to each other.

To permit the accomplishment of the flexing movement and relative lengthwise and widthwise movements, the binding or connecting means, generally identified in the embodiment 210 by the numeral 224, may have one of its zones of binding or adhesive surfaces 226 in lengthwise engagement with a lengthwise edge portion of the inner surface of the wider edges of the lower sheet member 14. Because the binding or connecting means 224 is wider in width than the distance between the connection that it makes with the outer surface of the sheet member 12 and that of the inner surface of the wider sheet member 14, there is a slight gathering or extra supply of material 254 and a space 227. This extra supply of material and space thus permits the upper and lower sheet members 12 and 14 to move widthwise or laterally relative to each other without disturbing the film 16 therebetween.

The deformable corrugations 228 provided in the binding or connecting means 224 enable the sheet members 12 and 14 to move lengthwise relative to each other. In like manner, if the connecting means 224 were constructed in the manner of the connecting means 124 previously described, the same relative lengthwise movement between the sheet members would be permitted.

In the present embodiment 210 it may be recognized that the sheet members 12 and 14 need not be composed of the same laminar construction as those previously described. In practical us, it has been found that where the film is to be exposed to radiation in order of less than 100,000 volts, opaque paper sheet members 12 and 14 may be utilized. Hence, it is entirely possible that the sheet members 12 and 14 may be comprised of an opaque paper whose radiation absorbing capability is far less than that of aluminum or lead or most other metallic opaque members.

When the sheet members 12 and 14 are constructed of an opaque paper, a unique arrangement permits the formation of an indexing means 46 thereon. This may be done by painting or applying a lead surface 256 lengthwise along an edge portion of the outer surface of one of the sheet members 12 or 14. Thus, to enable the production of an indexed image on the film 16 retained between the sheet members 12 and 14, it is merely necessary for the workman in the field to take a sharp instrument, as a knife, pencil or sharp stone, and disturb the surface 256 to remove a portion thereof. When a portion of the surface 256 is so disturbed and removed and the film 16 is exposed to radiation, that portion of the surface 256 so removably disturbed will leave an image on the film 16 which may be equivalent to the indexing image described with respect to the embodiments 10 and 110.

As in the previously described embodiments, if a capping structure for the lengthwise ends of the film holder 210 is required, the cap 34 previously described may be employed in the instant embodiment. As noted, the cap will not interfere with or in any way affect or vary the ability of the sheet members 12 or 14 to flex individually and to move lengthwise or widthwise relative to the other as they are snugly conformed about the workpiece. Hence, there will be no buckling or bubbling of the sheet members and the film 16 will remain in even spacing throughout its length from the workpiece surface.

Referring to FIG. 9, the embodiment of the film holder thereshown is generally identified by the numeral 310. As in the embodiment 10, the film holder 310 may include the sheet members 12 and 14, each of which are on opposite sides of a length of film 16. The sheet members 12 and 14 are of substantially equal width as in the embodiment 10 of FIGS. 1 and 2, but they are bound together for relative lengthwise or longitudinal movement, widthwise or transverse movement, and individual flexing or bending. The binding means or the means connecting the sheet members 12 and 14 together is generally identified by the numeral 324.

Each binding or connecting means 324 comprises a pair of upper and lower tape elements 323 and 325 that are of a light-tight or opaque flexible stretchable material. As in each prior embodiment disclosed previously, such material is made stretchable either because it is composed of an elastomeric base or because it is provided with irregular surfaces formed either by gathering the material, crepeing it, providing it with wrinkles or corrugations or any combination thereof. However, as noted previously, the term "corrugation" is employed throughout the disclosure of this invention to broadly include and encompass such constructions or any equivalent or any combination thereof. Bending or flexing the tape elements 323 and 325 will cause their corrugated surfaces to yield and deform thereby permitting the tape elements to stretch.

In the film holder 310, the upper tape elements 323 are of two zone adhesive construction, being bound to the longitudinal edges of the sheet member 12 at one of their zones 326. In like manner, the lower tape elements 325, also being of two zone construction, are bound at one of their zones 326a to their respective longitudinal edges of the sheet member 14. The binding or connection is then completed by connecting the two tape elements 323 and 325 of each of the respective sets of binding means 324 together along their remote edges at their remaining adhesive zones 326b. In consequence, a small longitudinally extending space 327 remains between the connected edges 326b of the tapes and the adjacet edges of the sheet members 12 and 14. Hence, in addition to the yield and relative lengthwise and widthwise movement of the sheet members 12 and 14 afforded by the give or deformation of the corrugations 328, the spaces 327 also permit sidewise movement of the sheet members relative to each other.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. A film holder comprising a pair of longitudinally extending opaque sheet-like members arranged in lengthwise overlying relation, a photo sensitive film positioned therebetween, and light-tight yieldable tape means yieldingly connecting said members together light-tightly along their lengths in their lengthwise overlying relation for movement relative to each other along their lengths and widths.

2. A film holder as in claim 1, one of said sheet-like members being wider than the other.

3. A holder for a strip of photo sensitive film having a preselected lengthwise and widthwise dimension, said holder comprising first and second members, said members each being adapted to be positioned on opposite sides of said film, said members each having opaque areas equal to at least the lengthwise and widthwise exposure dimensions of said film, and means light-tightly connected directly with said first and second members to connect the same together on their opposite sides along the edges of their lengths, said means being yieldable to enable relative lengthwise and widthwise movement of said lengthwise connected first and second members.

4. A film holder comprising upper and lower opaque members, a film member therebetween, said opaque members being connected directly with each other for relative movement and flexing movement, and means included in said connection directly connected with said opaque members and yieldable in response to the relative movement of said opaque members relative to each other and flexible in response to the flexing movement of said opaque members.

5. A holder for a length of film comprising a pair of longitudinally extending, flat flexible and relatively movable sheet members, each of said members being in lengthwise overlying relation with the other, the adjacent surfaces of said members being of opaque paper, and tape means connected to said sheet members to connect the same together light-tightly along the transverse edges of their lengths, said connecting means being flexible and yieldable to enable said sheet members to flex and move lengthwise and widthwise relative to each other without distorting the surfaces thereof.

6. A holder for a length of film as in claim 5, said connecting means being of light-tight flexible material having a plurality of deformable corrugations.

7. A holder for a length of film as in claim 5, said connecting means being of a flexible opaque grained material, one lengthwise portion thereof having the grain in one direction and another lengthwise portion being adjacent to said one portion having the grain thereof in another direction.

8. A holder for a length of film as in claim 5, a light-tight cap having an opening in one side thereof to receive one of the ends of said pair of sheet members therein to light-tightly close the same, and adhesive means on said cap to removably join the same to an outer surface of one of said sheet members.

9. A film holder comprising a pair of flexible sheet members each including relatively secured laminations of at least two radio lucent means one of said laminations being able to absorb less radiation than the other of said laminations of the same sheet member, said lesser radiation absorbing lamination being capable of absorbing less radiation than lead, said sheet members having their greater radiation absorbing laminations in facing relation, and separate flexible means connected with the opposite sides of said sheet members to connect the same directly together for flexible movement and limited relative lengthwise and widthwise movement.

10. In a film holder having flexible opaque longitudinally extending sheet members arranged in overlying relation, light-tight means connected to said sheet members to bind the same together directly with each other light-tightly along their lengths to retain the same in their overlying relation, said binding means being of a flexible deformable material of substantially the same lengthwise extent as said sheet members, and two zones of longitudinally extending laterally spaced engaging means on said binding means to engage lengthwise edge portions of said overlying sheet members and bind the same together for relative lengthwise and transverse movement and to enable individual flexing of said members while in said overlying relation.

11. In a film holder as in claim 10, said binding means being of a substantially opaque flexible material including deformable corrugations spaced therealong, and said engaging means being of an adhesive material.

12. In a film holder as in claim 10, said binding means being of an opaque flexible material having a plurality of differently directed grains with each of said differently directed grains bound to a respective one of said sheet members.

13. A film holder comprising a pair of opaque flexible sheet members arranged in overlying relationship to receive a length of photo sensitive film therebetween, flexible means connected to each of said sheet members binding said sheet members directly together in their overlying relationship for flexible movement thereof and relative lengthwise and widthwise movement therebetween, and at least one of said sheet members having means disturbable to enable the production of an indexing image on said film between said sheet members when said film is exposed to radiation.

14. A film holder comprising lengthwise extending upper and lower opaque flexible sheet members arranged in overlying relationship to receive a length of photo-sensitive film therebetween, means connected to each of said sheet members to bind the lengthwise edges of said sheet members directly together for flexible bending movement and relative lengthwise and widthwise movement, said binding means including a plurality of binding elements each secured to a respective one of said upper and lower sheet members and to each other, the connection of said binding elements to each other being spaced from respective edges of said sheet members.

References Cited by the Examiner
UNITED STATES PATENTS

| | | | |
|---|---|---|---|
| 1,396,415 | 11/21 | Fried | 250—68 |
| 1,698,058 | 1/29 | Martin | 250—68 X |
| 2,494,740 | 1/50 | Boucher | 250—68 |
| 2,769,095 | 10/56 | Forrer et al. | 250—68 |
| 2,922,047 | 1/60 | Tour | 250—68 |

RALPH G. NILSON, *Primary Examiner.*

ARCHIE R. BORCHELT, *Examiner.*

UNITED STATES PATENT OFFICE
CERTIFICATE OF CORRECTION

Patent No. 3,168,647            February 2, 1965

Alan S. Kollock

It is hereby certified that error appears in the above numbered patent requiring correction and that the said Letters Patent should read as corrected below.

Column 1, line 39, for "3,119,105" read -- 3,119,015 --.

Signed and sealed this 24th day of August 1965.

(SEAL)
Attest:

ERNEST W. SWIDER            EDWARD J. BRENNER
Attesting Officer            Commissioner of Patents